(12) United States Patent
Ruffa

(10) Patent No.: US 8,755,250 B1
(45) Date of Patent: Jun. 17, 2014

(54) LINE ARRAY DOPPLER PROCESSING

(75) Inventor: Anthony A. Ruffa, Hope Valley, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 439 days.

(21) Appl. No.: 13/154,569

(22) Filed: Jun. 7, 2011

(51) Int. Cl.
   *G01S 15/58* (2006.01)
(52) U.S. Cl.
   CPC ................................ *G01S 15/582* (2013.01)
   USPC ........................................................ 367/90
(58) Field of Classification Search
   CPC .............................. G01S 15/582; G01S 15/584
   USPC ........................................................ 367/90
   See application file for complete search history.

(56) References Cited

U.S. PATENT DOCUMENTS

| | | | | |
|---|---|---|---|---|
| 2,912,671 A * | 11/1959 | Hayes | | 367/91 |
| 3,423,754 A * | 1/1969 | Gunn | | 342/132 |
| 3,427,617 A * | 2/1969 | Richman | | 342/201 |
| 3,436,721 A * | 4/1969 | Farr | | 367/91 |
| 6,229,761 B1* | 5/2001 | Korolenko et al. | | 367/91 |
| 2010/0039899 A1* | 2/2010 | Vogt | | 367/99 |

\* cited by examiner

*Primary Examiner* — Isam Alsomiri
*Assistant Examiner* — Hovhannes Baghdasaryan
(74) *Attorney, Agent, or Firm* — James M. Kasischke; Jean-Paul A. Nasser; Michael P. Stanley

(57) ABSTRACT

A method is taught to extract more information about the motion of an acoustic wave emitter moving relative to a line array of hydrophones that are part of a sonar system by determining the variation in Doppler shift across the entire line array of hydrophones together with the a range measurement of the emitter to calculate the emitter's velocity.

4 Claims, 2 Drawing Sheets

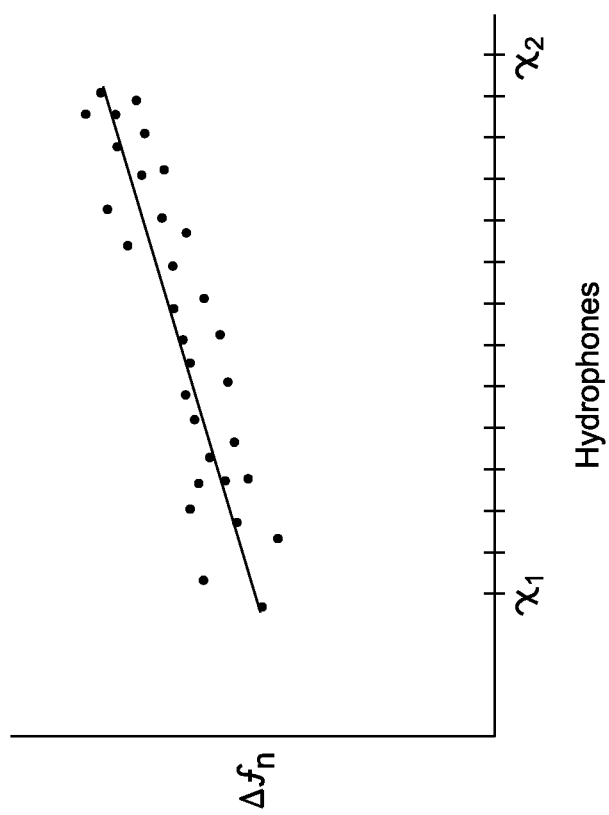

LINE ARRAY DOPPLER PROCESSING

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates to active sonar systems, and more specifically to a novel method of processing the Doppler shift from a line array of acoustic sensors to determine the speed of an acoustic wave emitter moving parallel to the line array.

(2) Description of the Prior Art

Certain sonar applications utilize the properties of Doppler effects to analyze the data obtained from acoustic wave receivers. The Doppler effect or Doppler shift expresses the apparent change in the frequency and wavelength of an acoustic wave perceived by an acoustic receiver that is moving relative to the source of the acoustic wave. This relative motion can be caused by the movement of the emitter, the receiver or both the emitter and the receiver. For example, a receiver having velocity $v_r$ relative to a source having velocity $v_s$ introduces a Doppler shift as follows:

$$f_d = f \frac{c + v_r}{c - v_s}.$$

The Doppler shift can be derived for a plane wave from a stationary source having a pressure field of the form $p(x,t) = P_0 e^{i(\omega t - kx)}$. A stationary receiver at $x=0$ measures the field $p(x,0) = P_0 e^{i\omega t}$, while a receiver moving according to $x = -vt$, i.e., opposite to the propagation direction of the plane wave, measures the field $p(x,t) = P_0 e^{i(\omega + \omega v/c)t} = P_0 e^{i\omega t(1+v/c)}$.

The Doppler effect produces a frequency shift when an object emitting acoustic waves is moving relative to an acoustic receiver such as a hydrophone. In the context of a sonar system, the Doppler effect is typically used only to determine the speed of the emitter along the line connecting the emitter and the receiver. When a line array of multiple receivers is used, however, there is the potential for extracting more information about the velocity of the emitter.

SUMMARY OF THE INVENTION

It is a general purpose and object of the present invention to determine the actual velocity of a moving acoustic wave emitter as detected by a line array of hydrophones.

This object is accomplished by a method of determining the Doppler shift across the entire line array of hydrophones through the use of a narrow band continuous wave pulse at a known frequency directed at a moving acoustic wave emitter, and then using the variation in the Doppler shifts across the multiple hydrophones in the array together with the a range measurement of the emitter to calculate the emitter's velocity.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 3 is an illustration of a linear least squares fit plot of multiple frequency shifts versus individual hydrophone array elements in a line array of N hydrophones.

DETAILED DESCRIPTION OF THE INVENTION

Figure 1:
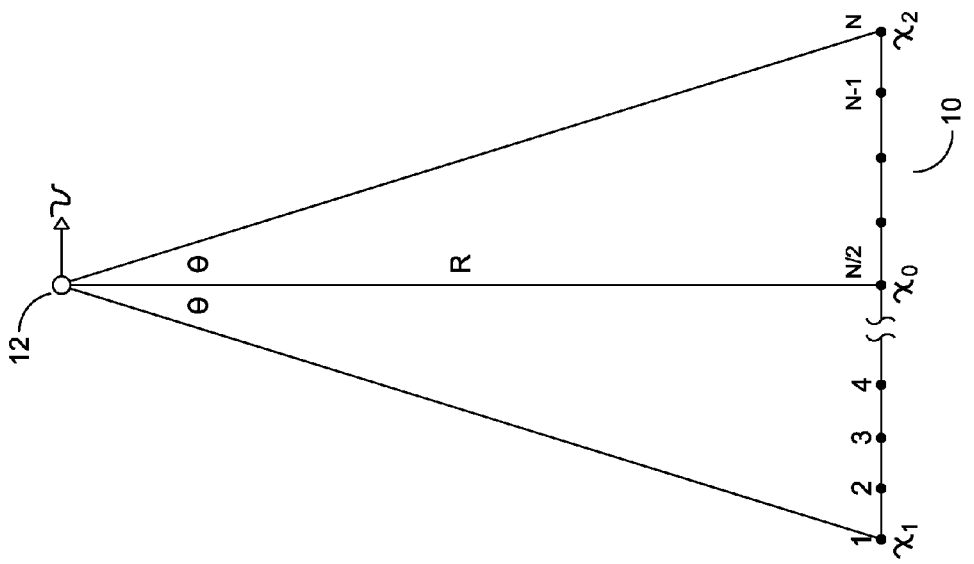
FIG. 1 is an illustration of a line array of hydrophones with an acoustic wave emitter aligned with the line array and moving parallel to the line array.

Referring now to FIG. 1 there is illustrated an implementation of the method of the present invention, which makes use of a long line array 10 of N hydrophones that is part of a sonar system 14 (not shown) to determine the velocity v of a moving object 12 that is emitting acoustic waves and that is located parallel to the line array 10. The sonar system 14 will have as part of the system components signal processors and data processors capable of receiving signals from the hydrophones in line array 10 and performing calculations on these received signals and plotting data. In the ideal situation, when the moving object 12 is aligned with the center of the line array 10 at point $x_0$, the Doppler Shift measured at $x_0$ is zero. However, the Doppler shift at the two ends ($x_1$ and $x_2$) is not zero. Measurement of the frequency shift is initiated with a narrowband non-continuous wave pulse of a known frequency $f_0$. The frequency shift at the two ends ($x_1$ and $x_2$) are as follows:

$$\frac{\Delta f_1}{f_0} = -\frac{v}{c}\sin\theta \cong -\frac{v}{c}\theta; \quad (1)$$

$$\frac{\Delta f_2}{f_0} = \frac{v}{c}\sin\theta \cong \frac{v}{c}\theta; \quad (2)$$

$$\therefore \frac{\Delta f_2 - \Delta f_1}{f_0} \cong \frac{2v\theta}{c} = \frac{v\Delta\theta}{c}. \quad (3)$$

where c is the speed of sound in water, $f_1$ is the frequency received at $x_1$ and $f_2$ is the frequency received at $x_2$, so that $\Delta f_1 = (f_1 - f_0)$ and $\Delta f_2 = (f_2 - f_0)$. The above equations (1)-(3) can be calculated by the sonar system 14.

Figure 2:
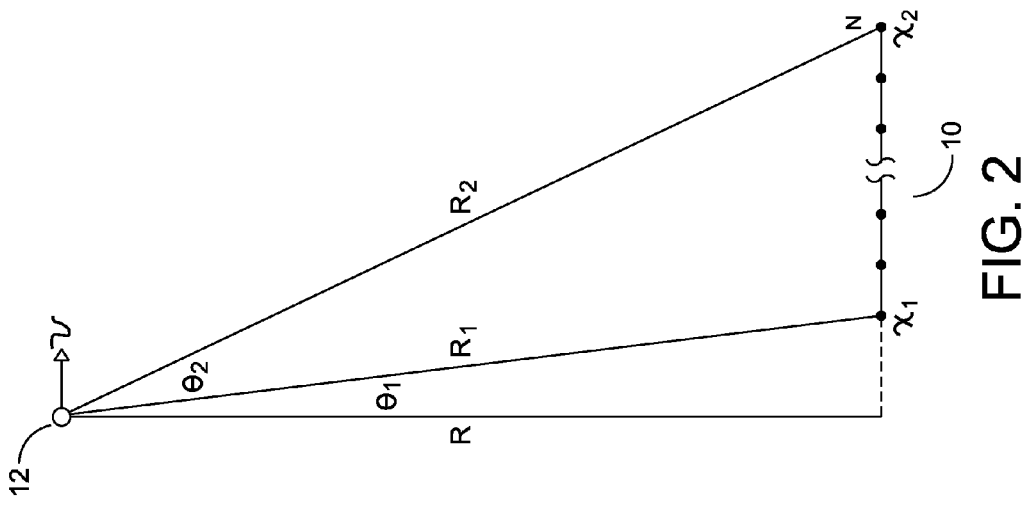
FIG. 2 is an illustration of a line array of hydrophones with an acoustic wave emitter that is not aligned at all with any part of the line array and moving parallel to the line array.

The Doppler shift varies linearly across the individual hydrophones (1 to N) of the line array 10. This is also true for the general case in which the moving object 12 is not aligned at all with any part of the array as illustrated in FIG. 2. The frequency shift in this case is given as follows:

$$\frac{\Delta f_2}{f_0} = -\frac{v}{c}\sin\theta_1 \cong -\frac{v}{c}\theta_2; \quad (4)$$

$$\frac{\Delta f_2}{f_0} = \frac{v}{c}\sin(\theta_1 + \theta_2) \cong \frac{v}{c}(\theta_1 + \theta_2); \quad (5)$$

$$\therefore \frac{\Delta f_2 - \Delta f_2}{f_0} \cong \frac{v\Delta\theta}{c}. \quad (6)$$

where $\Delta\theta = \theta_1 - \theta_1$. The above equations (4)-(6) can be calculated by the sonar system 14.

In active sonar, $f_0$ is known. The distance or range R from the object 12 to the line array 10 can be determined with a short non-continuous wave pulse. In the situation where R is much larger than the length of the line array 10, $(x_1-x_2)$, then the value of De can be calculated according to the following:

$$\Delta\theta = \frac{(x_1 - x_2)}{R}. \quad \text{Eq. (7)}$$

The equation (7) can be calculated by the sonar system 14.

Note that the range R of the object 12 is approximately the same for each element (1 to N), since as stated above the aperture length of the line array 10 is small compared to R. A line array has N hydrophones spaced $\lambda/2$ apart. Each hydrophone experiences a different frequency shift $\Delta f_z$ that varies linearly, based on its position on the line array 10. This results in the measurement of N different Doppler frequency shifts which is a significant data sample size. Since all of the frequency shifts must fit to a line in a plot of frequency shifts versus individual hydrophone array elements as illustrated in FIG. 3, then the data can be fit using a least squares fit to a line of frequency shifts versus hydrophones. The large data sample size increases signal data over noise thereby reducing error.

In the situation where the line array 10 is not long enough to get a measurable difference in Doppler shifts, a synthetic aperture can be formed as the line array 10 moves to get enough length to obtain a reliable measurement.

If there is any motion of the object 12 normal to the line array 10, this will lead to a competing effect involving the variation of the Doppler shift due to that motion. However, this effect is much smaller. For the same velocity v, the Doppler shifts at the left and right most elements of the array are respectively:

$$\frac{\Delta f_2}{f_0} = -\frac{v}{c}\cos\theta_1 \cong \frac{v}{c}\left[1 - \frac{\theta_2^2}{2}\right]; \quad (8)$$

$$\frac{\Delta f_2}{f_0} = -\frac{v}{c}\cos\theta_2 \cong \frac{v}{c}\left[1 - \frac{\theta_2^2}{2}\right]; \quad (9)$$

$$\therefore \Delta f_2 - \Delta f_1 \cong \frac{v}{2c}[\theta_1^2 - \theta_2^2]. \quad (10)$$

Since $\theta \ll 1$, then $\theta^2 \ll \theta$, so the difference in Doppler shift from the left or right most elements compared to the center element is much smaller due to the motion normal to the line array. However, this can also be accounted for with a least squares fit.

In active sonar, both the range, R, and the Doppler shift, $\Delta f_x = (f_x - f_0)$, are directly measureable by the sonar system 14. This enables the measurement of the velocity parallel to the line array 10, assuming that the variation in Doppler shifts, $\Delta f_2 - \Delta f_1/f_0$, along the line array 10 is measurable (either using the aperture length itself, or forming a synthetic aperture). For active sonar, the procedure involves first making contact with an object 12 with the line array 10 by pinging on it with a narrowband continuous wave pulse at a frequency $f_0$. A shorter pulse is used to estimate the distance R. A sufficient amount of data is acquired to estimate the Doppler shift. For example, if the Doppler shift is 1 Hz, approximately 1 second of continuous wave time series data is needed for resolution of the Doppler shift. The Doppler shift is then determined at the two end elements $x_1$ and $x_2$ of the line array 10. Measured Doppler shifts at the interior elements allow for confirmation of the estimate of any difference in frequency (by fitting them to a line, e.g., with a least-squares fit), leading to improved accuracy.

The advantage of the present invention over the prior art is that in sonar, normally, the motion of an object parallel to a line array can only be detected when the object moves from one beam to another. The present invention provides a much faster and more accurate way to measure the velocity of an object parallel to the line array.

In light of the above, it is therefore understood that within the scope of the appended claims, the invention may be practiced otherwise than as specifically described.

What is claimed is:

1. A method of determining the velocity of an underwater object moving parallel to an underwater line array of a plurality of N equally spaced acoustic sensors that are part of an active sonar system comprising:
   making contact with the underwater object with a narrow band continuous wave pulse from the active sonar system at a frequency $f_0$;
   determining the range R of the object from the line array with a shorter pulse from the active sonar system centered at a frequency $f_0$, wherein the time duration of the pulse is shorter than the time duration of the first narrow band continuous wave pulse;
   receiving a frequency $f_N$ at every acoustic sensor of the line array of N acoustic sensors;
   calculating the frequency shift $(T_N - f_0)$ for each of the N individual acoustic sensors of the line array of N acoustic sensors;
   plotting a line of frequency shift versus acoustic sensor for the measured Doppler shifts of a plurality of interior acoustic sensors to allow for confirmation of any difference in frequency using a linear least squares fit of the frequency shifts and to determine whether there is a measurable variation in the Doppler shift of the entire line array;
   calculating the variation in Doppler shift of the entire line array of N acoustic sensors, based on the frequency shift of the first acoustic sensor and the Nth acoustic sensor of the line array of N acoustic sensors, expressed as $$\frac{\Delta f_N - \Delta f_1}{f_0};$$

and determining the velocity of the underwater object according to the equation $$\frac{\Delta f_2 - \Delta f_1}{f_0} \cong \frac{v\Delta\theta}{c},$$

wherein c is the speed of sound in water and wherein $\Delta\theta$ is equal to the length of the line array of N acoustic sensors divided by the range R of the underwater object.

2. The method of claim 1 further comprising the step of forming a synthetic aperture as the line array of N acoustic sensors moves to get more aperture to increase the measurement accuracy relative to a line array of N acoustic sensors by increasing the measurable difference in the variation in Doppler shifts.

3. The method in claim 1, further comprising a method to determine the variation of the Doppler shift due to the motion of the object normal to the line array using the equation $$\Delta f_2 - \Delta f_1 \cong \frac{v}{2c}[\theta_1^2 - \theta_2^2].$$

4. The method in claim 3, further comprising the removal of any frequency shifts due to the motion of the object normal to the line array by fitting the difference in frequency to a line with a least squares fit, thereby more accurately determining the motion of the object parallel to the line array.

\* \* \* \* \*